United States Patent [19]

van der Lely

[11] 4,099,575
[45] Jul. 11, 1978

[54] SOIL CULTIVATING IMPLEMENTS

[75] Inventor: Ary van der Lely, Maasland, Netherlands

[73] Assignee: C. van der Lely N.V., Maasland, Netherlands

[21] Appl. No.: 746,805

[22] Filed: Dec. 2, 1976

[30] Foreign Application Priority Data

Dec. 2, 1975 [NL] Netherlands ............... 7514005

[51] Int. Cl.² ........................... A01B 33/06
[52] U.S. Cl. ..................... 172/59; 172/117
[58] Field of Search ............ 172/117, 49, 63, 59, 172/47, 72, 71, 68, 657, 619, 484, 307, 658

[56] References Cited

U.S. PATENT DOCUMENTS

| 3,821,989 | 7/1974 | Lely et al. | 172/59 |
| 3,885,633 | 5/1975 | Lely et al. | 172/117 |
| 4,018,170 | 4/1977 | Lely et al. | 172/68 |

FOREIGN PATENT DOCUMENTS 322,140   2/1972   U.S.S.R. ............... 172/658

Primary Examiner—Richard J. Johnson
Attorney, Agent, or Firm—Mason, Mason & Albright

[57] ABSTRACT

This invention relates to soil cultivating implements having a frame portion that carries a plurality of soil working members arranged in a row that extends transverse to the direction of operative travel. The frame portion is linked to a supporting structure provided with a coupling connection to a prime mover. The linkage between the frame portion and the supporting structure is such that the frame portion is upwardly and downwardly displaceable relative to the supporting structure and guides are located close to the linkage to guide upward and downward movements of the linkage arms and prevent lateral movements of the frame portion during travel.

13 Claims, 2 Drawing Figures

SOIL CULTIVATING IMPLEMENTS

Figure 1:
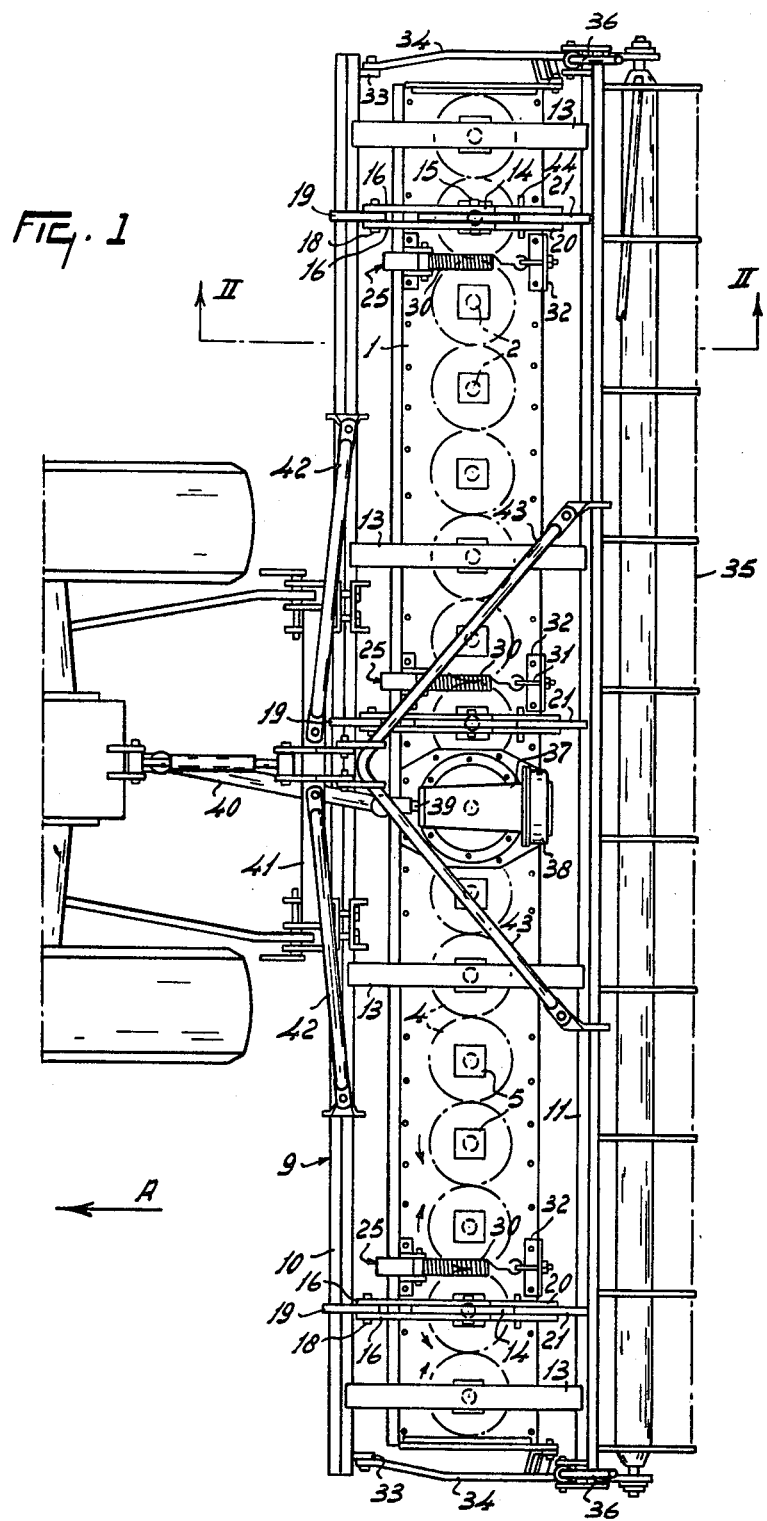
Figure 2:
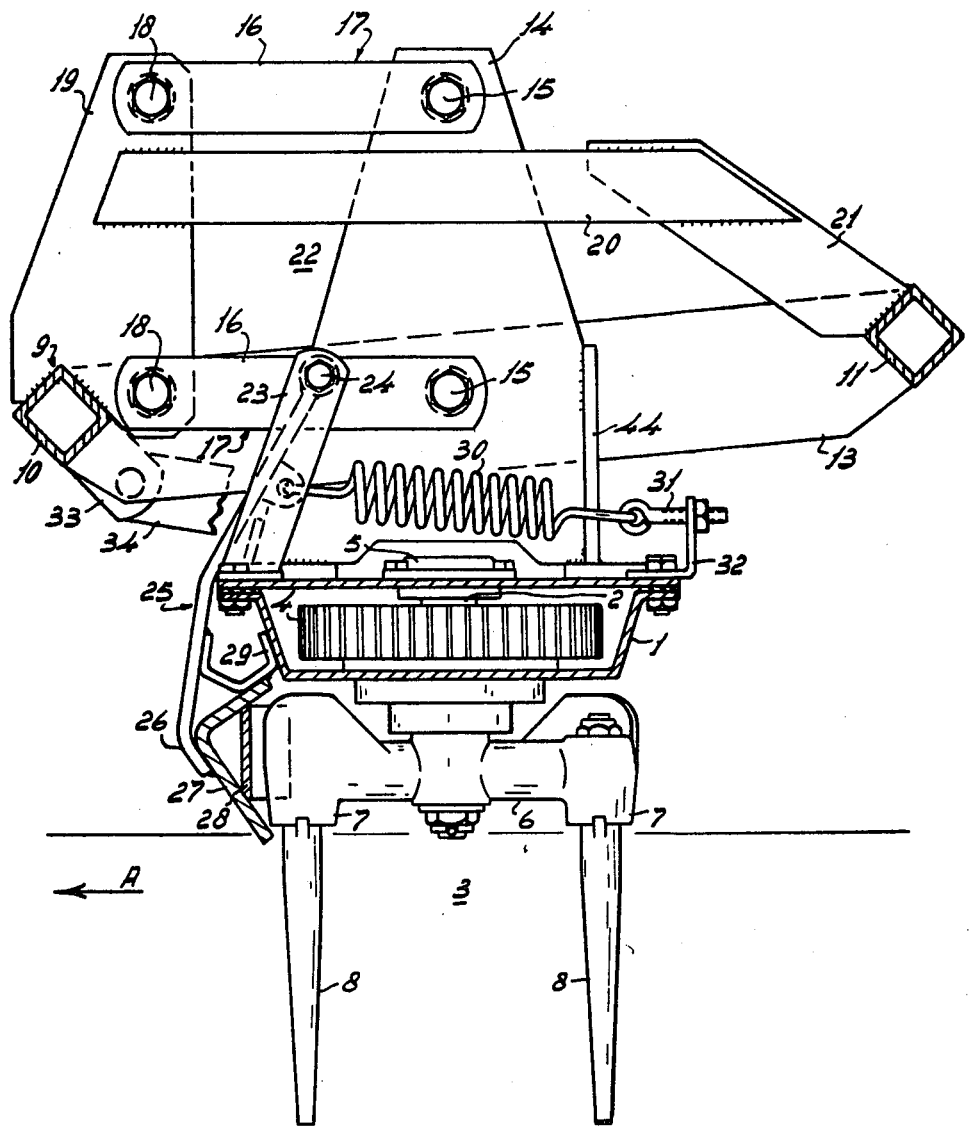

For a better understanding of the invention, and to show how the same may be carried into effect, reference will now be made, by way of example, to the accompaying drawings, in which:

FIG. 1 is a plan view of a soil cultivating implement in accordance with the invention connected to the rear of an agricultural tractor, and FIG. 2 is a section, to an enlarged scale, taken on the line II—II in FIG. 1 but with the omission of a rear rotatable supporting member of the implement and its associated parts.

Referring to the accompanying drawings, the soil cultivating implement that is illustrated therein has a hollow box-shaped frame portion 1 that extends substantially horizontally transverse, and usually substantially horizontally perpendicular, to the intended direction of operative travel of the implement that is indicated by an arrow A in both Figures of the drawings. A plurality (in this case, 16) of substantially vertical or at least upwardly extending shafts 2 are rotatably mounted in the frame portion 1 so as to lie in a single row that is parallel to the transverse length of the hollow frame portion 1 and thus perpendicular or substantially perpendicular to the direction A. The shafts 2 are rotatably supported by lower bearings carried by the lower wall of the hollow frame portion 1 and by aligned upper bearings carried in bearing housings 5 that are bolted to the margins of holes in the top wall or cover of the frame portion 1. The axes of rotation of the sixteen parallel shafts 2 are regularly spaced apart from one another by distances which preferably, but not essentially, have magnitudes of substantially 25 centimeters. Each shaft 2 is provided, inside the hollow frame portion and between the corresponding upper and lower bearings, with a straight-toothed or spur-toothed pinion 4, the pinions 4 being dimensioned and arranged in such a way that the teeth of each pinion 4 are in mesh with those of its immediate neighbour, or with those of both of its immediate neighbours, in the single row of sixteen pinions 4. The lowermost ends of the shafts 2 project downwardly from beneath the bottom of the hollow frame portion 1 where they are splined or otherwise keyed so as firmly but releasably to receive matchingly splined or keyed hubs at the centers of corresponding substantially horizontally disposed tine supports 6. The opposite ends of each tine support 6 are provided with substantially cylindrical sleeve-like tine holders 7 whose axes are parallel or substantially parallel to the axis of rotation of the corresponding shaft 2. Each holder 7 firmly but releasably receives a fastening portion of a corresponding rigid soil working tine 8, each tine 8 also having a soil working portion that projects downwardly into the soil, during the use of the implement, from substantially the lower end of its holder 7. It is preferred, but is not essential, that the soil working portion of each rigid tine 8 should trail rearwardly from top to bottom by a few degrees with respect to the intended direction of operative rotation of the corresponding shaft 2 and it is noted that the directions of rotation of some of the shafts 2 are indicated by small arrow in FIG. 1 of the drawings. It can be seen in FIG. 2 that the top of the supports 6 and tine holders 7 integrally or rigidly carry shield plates which are located in front of fastening nuts of the tines 8 with respect to the intended directions of operative rotation that have just been mentioned so as to shield those knots and sort screwthreaded upper parts of the tine fastening portions with which they cooperate from damage by sharp stones and the like that may be met with when the implement is in use. Each of the tine supports 6, together with the corresponding tine holders 7 and tines 8, constitutes a rotary soil working or cultivating member that is generally indicated by the reference 3 and there are thus sixteen of the members 3 carried at the lower ends of the respective sixteen shafts 2. It will be realised that, during operation, each member 3 will, like the corresponding shaft 2, revolve in a direction which is opposite to the direction of rotation of its immediate neighbour, or to the directions of rotation of both of its immediate neighbours, in the single row of sixteen members 3.

A supporting structure for the frame portion 1 and the parts which that frame portion carries is arranged wholly or principally at a level above that of the hollow frame portion 1, said supporting structure being generally indicated by the reference 9. The supporting structure 9 includes two frame beams 10 and 11 that are parallel to one another and substantially horizontally perpendicular, or at least transverse, to the direction A, both beams 10 and 11 being of hollow formation and of a polygonal cross-section which is preferably, but not essentially, the square cross-section that is illustrated. With this preferred square cross-section, both of the two beams 10 and 11 are arranged so that the two diagonals of their cross-sections are respectively substantially vertically, and substantially horizontally, disposed. The leading frame beam 10 of the supporting structure 9, with respect to the direction A, is at a slightly lower horizontal level than is the rear frame beam 11 (see FIG. 2) and they are rigidly interconnected at four substantially regularly spaced apart locations along their lengths by support plates 13 that are substantially parallel to the direction A (at least as seen in plan view — FIG. 1), two of said support plates 13 being located at only short distances inwardly from the opposite ends of the beams 10 and 11. The top of the frame portion 1 is provided at three separate locations with corresponding upright supports 14 whose general planes are in substantially vertically parallel relationship with one another and with the direction A. Reference to FIG. 1 of the drawings shows that, in the example that is being described, there are three of the upright supports 14 that are respectively in register, as seen in FIG. 1, with the two shafts 2 that are second along the row of sixteen shafts 2 counting from the opposite ends of that row and with the eighth shaft 2 along said row counting from the right-hand end thereof when the implement is viewed from the rear. One of the three identical upright supports 14 can be seen in FIG. 2 of the drawings and it is evident from that figure that the width of each support 14, measured in the direction A, is considerably greater at the bottom thereof than it is at the top thereof, the basal width being greater than half the width, in the same direction, of the frame portion 1 and each support 14 having an upwardly tapering configuration.

Upper and lower substantially horizontally disposed pivot bolts 15 connect the rear ends of pair of arms 16 to each upright support 14 near the top thereof and at a position spaced by some distance above the bottom thereof. The two arms 16 of each pair are locted at respectively opposite sides of the corresponding upright support 14, said two arms 16 of each pair together affording a corresponding pivotable supporting link 17.

The links 17 extend forwardly with respect to the direction A from the pivot bolts 15 and their leading ends are turnably connected, by further parallel and substantially horizontally disposed pivot bolts 18, to upper and lower locations on corresponding upright brackets 19. The bottoms of the three upright brackets 19 are welded or otherwise rigidly secured to the top of the leading frame beam 10 of the supporting structure 9 at locations just in front of the lower pivot bolts 18 with respect to the direction A. Support brackets 21 are welded or otherwise rigidly secured to the rear frame beam 11 of the supporting structure 9 so as to project upwardly and forwardly therefrom with respect to the direction A (see FIG. 2). The upper ends of the support brackets 21 are rigidly connected to the corresponding upright brackets 19, that are substantially in register therewith in the direction A, by pairs of strips 20 that extend substantially horizontally between the support brackets 21 and the upright brackets 19 with their parallel planes substantially vertically disposed, the two strips 20 of each pair being located very close to the opposite sides of the corresponding upright support 14 and approximately the leading halves thereof with respect to the direction A being located vertically beneath the two arms 16 of the corresponding upper pivotable supporting link 17. With this arrangement, the strips 20 are, of course, also located vertically above the two arms 16 of the corresponding lower pivotable supporting link 17 and, with said arms 16 extending substantially horizontally parallel to the direction A as is illustrated in FIG. 2 of the drawings, the vertical distance between the strips 20 and the lower links 17 is not less than four times the vertical distance between the strips 20 and the upper links 17. The pivot bolts 15 and 18 are at the four corners of corresponding pivotable linkages which, in the case of the example that is being described, are parallelogram linkages generally indicated by the reference 22, so that the hollow frame portion 1 carrying the rotary soil working or cultivating members 3 can move freely upwardly and downwardly relative to the supporting structure 9 without significant tilting. The pairs of strips 20 co-operate in guiding the upward and downward movements of the intervening upright supports 14 and prevent any appreciable lateral displacement of the hollow frame portion 1 relative to the supporting structure 9 and it will be noted that the guide strips 20 are located very close to the upper pivotable supporting links 17 of the corresponding parallelogram linkages 22.

Three pairs of supports 23 are secured to the top and front of the hollow frame portion 1 so as to extend upwardly and rearwardly with respect to the direction A away from their fastening points, the three pairs of supports 23 being disposed at two locations which are approximately 50 centimeters from the opposite ends of the frame portion 1 and at a third location which is close to the center of the frame portion 1 but a little nearer to one of the first and second locations than it is to the other. The upper rearmost ends of the two supports 23 of each pair are interconnected by a corresponding pivot bolt 24, the three pivot bolts 24 being substantially horizontally aligned in a direction parallel to the row of soil working or cultivating members 3 and thus in a direction that is perpendicular or substantially perpendicular to the direction A. Each pivot bolt 24 has the upper end of a corresponding strip-shaped supporting arm 25 turnably mounted on it between the two supports 23 of the corresponding pair. It will be seen from the drawings that the width of each strip-shaped supporting arm 25 extends substantially horizontally perpendicular to the direction A, the three arms 25 being of an identical shape that can be seen in FIG. 2. Each arm 25 comprises an upper flat portion that extends downwardly and forwardly with respect to the direction A from the corresponding pivot bolt 24 to substantially the level of the top of the hollow frame portion 1. At this level, the arm 25 is bent over downwardly to form a second intermediate flat portion that is inclined by only a few degrees to the vertical. Finally, at substantially the level of the tops of the tine supports 6 of the members 3, each arm 25 is again bent over so as to form a lowermost portion 26 that is inclined downwardly and rearwardly with respect to the direction A from its integral junction with the intermediate portion of the corresponding arms 25. The portions 26, like the other portions of the arms 25, is substantially flat and thus a rectilinear configuration as seen in the side elevation of FIG. 2.

The lowermost portions 26 of the three arms 25 have their rear surfaces, with respect to the direction A, welded or otherwise rigidly secured to the front of a beam 27 of L-shaped cross-section that extends throughout substantially the whole of the working width of the 16 rotary soil working or cultivating members 3. As seen in FIG. 2 of the drawings, the portions 26 of the arms 25 are rigidly secured to the front of the beam 27 just below the junction between its two limbs, the arrangement of said beam 27 being such that those limbs extend downwardly and rearwardly, and upwardly and rearwardly, respectively, from said junction. The rear surfaces of the two limbs of the beam 27 are rigidly interconnected by a strip 28 that extends substantially horizontally throughout the length of the beam 27 with its general plane orientated vertically or substantially vertically. The opposite ends of the strip 28 are, however, bent over so as to extend substantially perpendicularly rearwardly from the remainder of the strip with respect to the direction A (see FIG. 2). The rear of the second intermediate portion of each arm 25 with respect to the direction A is provided, at a level above that of the transverse beam 27, with a bracket 29. Each bracket 29 has four limbs as seen in FIG. 2 of the drawings, the leading upper limb being welded or otherwise rigidly secured to the corresponding arm 25 and the back of the rear upper limb bearing in surface-to-surface relationship against a front wall of the hollow frame portion 1. The two intervening limbs (as seen in FIG. 2) are inclined both to one another and to the two limbs that have just been discussed and extend, again as seen in FIG. 2, in shallow V-shaped relationship. The rear one of the two intervening limbs bears against the upper surface of the upper limb of the beam 27 and is preferably, but not essentially, welded or otherwise rigidly secured to that surface. The leading and rear upper limbs of each bracket 29 are upwardly convergent as seen in FIG. 2.

The transverse beam 27 is located at the same horizontal level as is the tine supports 6 and the tine holders 7 and serves, with the strip 28, to protect those parts against collisions with stones and other potentially damaging items during the progress of the implement in the direction A. The upper flat portion of each arm 25 is provided, substantially midway between the corresponding pivot bolt 24 and the integral junction with the corresponding second intermediate portion of the same arm, with a rearwardly projecting apertured lug into which is hooked one end of a corresponding helical tension spring 30. The longitudinal axes of the three springs 30 extend substantially horizontally parallel to the direction A in fore and aft directions and their rearmost ends are hooked to eyes 31 carried by the upright limbs of angle brackets 32 which are fastened to the top and rear of the frame portion 1 with respect to the direction A. It will be seen from FIG. 2 of the drawings that the shank of each eye 31 that is entered through a hole in the upright limb of the corresponding angle bracket 32 is screwthreaded and cooperates with a nut disposed at the back of said limb. Axial displacement of each nut lengthwise along the shank of the co-operating eye 31 will increase or decrease the initial tension in the corresponding spring 30.

The rear of the leading frame beam 10 of the supporting structure 9 with respect to the direction A is provided, close to the opposite ends of said beam, with downwardly and rearwardly projecting lugs 33 that carry substantially horizontally aligned pivot pins. The leading ends of two symmetrically identical arms 34 are mounted on said pivot pins so as to be upwardly and downwardly turnable thereabout at short distances beyond the opposite ends of the hollow frame portion 1 as seen in the plan view of FIG. 1 of the drawings. The rearmost ends of the two arms 34 are provided with substantially horizontally aligned bearings in which a rotatable supporting member of the implement, in the form of an open ground roller 35, is journalled. The longitudinal axis (axis of rotation) of the roller 35 extends substantially horizontally parallel to the frame portion 1 and to the beams 10 and 11 of the supporting structure 9 and thus perpendicular or substantially perpendicular to the direction A. The roller 35 extends throughout substantially the whole of the working width of the sixteen rotary soil working or cultivating members 3 and sustains the supporting structure 9 from the ground surface when the implement is in use. The roller 35 comprises a central axially extending tubular support provided at its opposite ends with coaxial stub shafts that co-operate with the bearings carried by the arms 34. A plurality, such as ten, of support plates are secured to the central support of the roller 35 at regular intervals along its length in parallel relationship with each other and substantially parallel relationship with the direction A. Each support plate is of circular or generally circular configuration and is formed near its periphery with a plurality of holes that are spaced apart from one another at regular angular intervals around the axis of rotation of the roller and a plurality of elongate elements that may be of either tubular or solid rod-like configuration are inserted lengthwise through the substantially peripheral holes in the successive support plates. Only part of one of these elongate elements is illustrated in FIG. 1 of the drawings but it will be seen from that Figure that said elements are preferably arranged so as to extend helically around the axis of rotation of the roller 35 to some extent. Brackets are secured to the rear frame beam 11 of the supporting structure 9 at the opposite ends of that beam and pivotally support corresponding height adjustment mechanisms 36. The height adjustment mechanisms 36 interconnect the beam 11 and locations on the arms 34 that are a short distance in front of the rearmost ends of those arms and an increase or decrease in the effective lengths of the mechanisms 36 will thus turn the rear of the supporting structure 9 either upwardly, or downwardly, about the pivotal axis between the arms 34 and the lugs 33. Generally speaking, the level of the leading frame beam 10 of the structure 9 will be dictated by the connection thereof to the three-point lifting device or hitch of an agricultural tractor or other operating vehicle as will be briefly described below. It is not necessary to describe nor to illustrate the construction of the height adjusting mechanisms 36 in detail since such mechanisms are well known per se. Suffice it to say that each such mechanism 36 includes a rotatably mounted screwthreaded spindle having a manually operable crank handle at its upper end and a member that will be moved axially along the screwthreaded portion of said spindle in response to operation of the crank handle.

The shaft 2 that corresponds to one of the center pair of members 3 of the row of sixteen of those members has an upward extension through the top of the hollow frame portion 1 into a gear box 37 that is mounted on top of said frame portion. The shaft 2 in question is, in fact, the immediate neighbour of the shaft 2 that is in register with the approximately central upright support 14 when the implement is seen in plan view (FIG. 1). Bevel pinions (not visible) within the gear box 37 place the upward extension of said shaft 2 in driven connection with a substantially horizontal shaft (also not visible) that extends parallel or substantially parallel to the direction A. A further shaft 39 that extends parallel to the substantially horizontal shaft that has just been mentioned in vertically spaced apart relationship with that shaft has a leading splined or otherwise keyed end that projects forwardly from the front of the gear box 37 in substantially the direction A to serve as a rotary input shaft of that gear box that can be placed in driven connection with the power take-off shaft of an agricultural tractor or other operating vehicle by way of an intermediate telescopic transmission shaft 40, that is of a construction which is known per se, having universal joints at its opposite ends. The rearmost ends, with respect to the direction A, of the shaft 39 and of the underlying shaft (not visible) that is parallel thereto both project through the back of the gear box 37 into a change-speed gear 38 that is fastened to the rear of said gear box. It is not necessary to describe the construction and operation of the change-speed gear 38 in any detail for the purposes of the present invention but, briefly, it comprises a plurality of pairs of co-operating straight-toothed or spur-toothed pinions of different sizes having internally splined or otherwise keyed hubs that will co-operate both interchangeably and exchangeably with the matchingly splined or otherwise keyed rear ends of the two shafts that project into the change-speed gear 38. The particular pair of pinions that is chosen for co-operation with said shaft ends, and the arrangement of said pair relative to those shaft ends, dictaces the transmission ratio between the substantially horizontal shaft 39 and the underlying and relatively parallel shaft that is not visible in the drawings and thus the speed at which the shafts 2 and the soil working or cultivating members 3 that they carry will be revolved in response to a more or less constant input speed of rotation applied to the leading end of the shaft 39. The leading frame beam 10 of the supporting structure 9 is provided, midway along its transverse length, with a coupling member or trestle 41 that is of substantially triangular configuration as seen in front or rear elevation. The coupling member or trestle 41 is constructed and arranged to connect the supporting structure 9 to the three-point lifting device or hitch at the rear of an agricultural tractor or other operating vehicle in a manner that is generally known per se and that can be seen, in outline, in FIG. 1 of the drawings. Two downwardly divergent strengthening tie beams 42 rigidly but releasably interconnect locations close to the apex of the coupling member or trestle 41 to two widely spaced apart locations on the frame beam 10. Two further strengthening tie beams 43 that are downwardly and rearwardly divergent interconnect substantially the top and rear of the coupling member or trestle 41 and two widely spaced apart locations on the rear frame beam 11 of the supporting structure 9. The two tie beams 43 may, as illustrated, conveniently be integral with each other.

In the use of the soil cultivating implement that has been described, its coupling member or trestle 41 is connected to the three-point lifting device or hitch of an agricultural tractor or other operating vehicle in the manner that can be seen in FIG. 1 of the drawings and that has been briefly described above. The rotary input shaft 39 of the gear box 37 is placed in driven connection with the power take-off shaft of the same tractor or other operating vehicle by way of the known telescopic transmission shaft 40 that has universal joints at its opposite ends. Before work commences, the change-speed gear 38 may require adjustment to increase or decrease the speed of revolution of the soil working or cultivating members 3 in response to a more or less constant input speed of rotation applied to the shaft 39 and the mechanisms 36 may require to be either lengthened or shortened to raise or lower the supporting structure 9 relative to the roller 35 which sustains it from the ground surface. The latter adjustment governs the maximum depth to which the tines 8 of the members 3 can penetrate into the soil because the pairs of guide strips 20 lie below the arms 16 of the upper pivotable supporting links 17 and thus act as upwardly and downwardly adjustable stops whose levels dictate how far downwardly the upright supports 14, and thus the frame portion 1 and rotary soil working or cultivating members 3, can move relative to the supporting structure 9. The adjustments in question are made having regard to the nature and condition of the soil that is to be dealt with and the particular purpose for which that soil is required after cultivation. As the implement moves operatively over the ground in the direction A, its soil working or cultivating members 3 will revolve in the successively opposite directions that are indicated by small arrows for some of them in FIG. 1 of the drawings and the tines 8 thereof will work a single broad strip of soil because the working width of each member 3 is somewhat greater than is the regular distance between the axes of rotation of immediately neighbouring shafts 2. In the particular example that is being described, the implement has an overall working width of substantially 4 meters.

As previously mentioned, the frame portion 1 which carries the rotary soil working or cultivating members 3 is movable upwardly and downwardly relative to the supporting structure 9, without significant tilting, as a result of its connection to that supporting structure 9 through the intermediary of the three parallelogram linkages 22. Thus, if one or more of the tines 8 should meet a firmly embedded stone or other substantially immovable obstacle in the soil, the frame portion 1 and the members 3 can deflect upwardly to avoid that obstacle and prevent, or greatly minimise, damage to the obstructed tine or tines 8. Lateral deflection of the frame portion 1 and the members 3 which it carries is substantially prevented by co-operation of the upright supports 14 with the immediately flanking guide strips 20, this arrangement also giving reliable operation of the parallelogram linkages 22 which might tend to become twisted or otherwise deformed in the absence of the co-operation between the upright supports 14 and the guide strips 20, the latter being very close to the upper links 17 of said parallelogram linkages 22.

Any obstacle that may be met with by at least one tine 8 and that thus initiates a force tending to deflect the frame portion 1 and members 3 laterally of the direction A is transferred to the rigid supporting structure 9 through the considerable areas of contact between the flat sides of the three upright supports 14 and the flat inner sides of three of the six strips 20 so that no part of the implement is subjected to a force that will cause permanent bending thereof. As previously mentioned above, the upper edges of the strips 20 lie in the paths of downward movement of the lower edges of the arms 16 of the upper pivotable supporting links 17 so that the guide strips 20 also constitute stops that limit the downward movability of the frame portion 1 and members 3 relative to the supporting structure 9, the stops being upwardly and downwardly adjustable in position in the manner that has been described above by displacing the roller 35 upwardly or downwardly relative to the supporting structure 9, employing the height adjustment mechanisms 36. In addition to providing depth control for the members 3 during operation of the implement, the strips 20 also prevent the frame portion 1 and members 3 from turning too far downwardly when the three-point lifting device or hitch of the agricultural tractor or other operating vehicle is raised to bring the whole implement clear of contact with the ground for inoperative transport purposes. It is also desirable that the frame portion 1 and soil working or cultivating members 3 should not be able to move too far upwardly with respect to the supporting structure 9 and, to this end, substantially vertical stop plates 44 are welded or otherwise rigidly secured to the rear edges of the upright supports 14 in such positions that their general planes are perpendicular or substantially perpendicular to the direction A. It will be apparent from the drawings that excessive upward displacement of the frame portion 1 and members 3 relative to the supporting structure 9 will bring the upper edges of the stop plates 44 into contact with the lower edges of the guide strips 20.

In addition to shielding the tine supports 6, the tine holders 7 and the fastening portions of the tines 8 from collisions with sharp stones and other potentially damaging articles, the lower edge of the transverse beam 27 performs a levelling action upon the soil surface immediately in advance of the members 3, the downward and rearward inclination of the lower limb of said beam 27 tending to press any stones or the like on the surface of the soil downwardly into the ground. If, exceptionally, a stone or the like should become momentarily jammed between one or more of the members 3 and the transverse beam 27 or the strip 28 that is secured thereto, said beam 27 and strip 28 can deflect forwardly about the axis defined by the pivot bolts 24, against the action of the tension springs 30, to allow the jammed stone or the like to be released. When such release has taken place, the springs 30 immediately restore the position that is illustrated in the drawings in which the upper rear limbs of the brackets 29 bear against the front wall of the hollow frame portion 1. It is noted that, as seen in plan view (FIG. 1), the pivot bolts 24 are located between the front and rear edges of the frame portion 1. This feature, together with the fact that the widths of the strip-shaped supporting arms 25 are perpendicular or substantially perpendicular to the direction A, ensures that, even when the frame portion 1 and soil working or cultivating members 3 are displaced upwardly to a considerable extent during operation of the machine and the beam 27 and strip 28 are simultaneously forwardly displaced by a stone or the like, the arms 25 will not make what would be undesirable contacts with the leading frame beam 10 of the supporting structure 9.

Although various features of the soil cultivating implement that have been described and/or that are illustrated in the accompanying drawings will be set forth in the following claims as inventive features, it is emphasised that the invention is not necessarily limited to those features and that it includes within its scope each of the parts of the soil cultivating implement that has been described, and/or that is illustrated in the accompanying drawings, both individually and in various combinations.

What we claim is:

1. A soil cultivating implement comprising a supporting frame structure and a plurality of soil working members rotatably mounted on an elongated frame portion that extends transverse to the direction of travel, said supporting structure including bracket means, linkage assemblies interconnecting said bracket means with at least one upwardly extending support secured to said frame portion, said linkage assemblies comprising vertically spaced apart links with pivots and said frame portion together with the soil working members being displaceable vertically with respect to the supporting structure about said pivots, stops positioned to each side of said support, between said spaced apart links to limit the lateral movements of the frame portion relative to the supporting structure.

2. An implement as claimed in claim 1, wherein said bracket means includes brackets mounted along the length of the frame structure and a corresponding support for each bracket, said links including pairs of generally horizontal arms that pivotally interconnect said bracket to the support.

3. An implement as claimed in claim 2, wherein said arms extend in the direction of travel and an upper pair of arms is positioned above a lower pair of arms, respective stops being fixed to said brackets and positioned at each side of said support.

4. An implement as claimed in claim 3, wherein said bracket means comprises a front bracket and a rear bracket, said stops being fixed to corresponding front and rear brackets and extending across each side of said support.

5. An implement as claimed in claim 4, wherein said supporting structure includes two spaced apart frame beams and said brackets are secured to said beams.

6. An implement as claimed in claim 3, wherein said upper arms and stops are spaced apart from one another by a distance less than that between said lower link and said guide means.

7. An implement as claimed in claim 6, wherein the distance between said lower arms and the stops is not less than four times the distance between the upper arms and said stops.

8. A soil cultivating implement comprising a supporting frame structure and a plurality of soil working members rotatably mounted on an elongated frame portion that extends transverse to the direction of travel, said supporting structure including bracket means, linkage assemblies interconnecting said bracket means with upwardly extending supports secured to said frame portion, said linkage assemblies comprising vertically spaced apart links with pivots and said frame portion together with the soil working members being displaceable vertically with respect to the supporting structure about said pivots, elongated strip-like stops being positioned at each side of a respective support, between said links to limit the lateral movements of the frame portion relative to the said structure, the widths of said stops being substantially vertical.

9. An implement as claimed in claim 8, wherein a further stop is connected to the rear of at least one support to contact said strip-like stops and prevent excessive upward displacement of the frame portion relative to the supporting structure.

10. An implement as claimed in claim 9, wherein said further stop extends upwardly from the bottom of the support to a level at least halfway between the bottom and the top of said support.

11. A soil cultivating implement comprising a supporting frame structure and a plurality of soil working members rotatably mounted on an elongated frame portion, that extends transverse to the direction of travel, said supporting structure including a leading frame beam and a rear frame beam and bracket means secured to said leading frame beam, linkage assemblies interconnecting said bracket means to upwardly extending supports secured to said frame portion, said linkage assemblies comprising vertically spaced apart pairs of links with pivots and said frame portion, together with the soil working members, being displaceable vertically with respect to said supporting structure about said pivots, elongated stops positioned at each side of each support and between the spaced apart pairs of links to limit the lateral movements of the frame portion relative to said structure, said stops and links extending substantially horizontally and adjacent one another.

12. An implement as claimed in claim 11, wherein a protective beam extends transverse to the direction of travel and is located at the front of said frame portion, said beam being pivotably mounted on the implement and turnable about an axis located between the front and rear edges of said frame portion.

13. An implement as claimed in claim 12, wherein said protective beam is connected to the frame portion by a plurality of supporting arms which are turnable about pivot axes, said supporting arms being strip-shaped with their widths transverse to the direction of travel, each supporting arm being bent over downwardly adjacent said frame portion to form a substantially vertical portion, a lower end portion of said supporting arm being bent rearwardly and said protective beam being connected to the end portion, bracket means on the protective beam positioned to limit rearward movement of that beam about said pivots, said bracket means being located above said protective beam to bear against a front wall of said frame portion.

* * * * *